June 18, 1968  R. T. BURNETT  3,388,774
ADJUSTABLE BEARING MEANS FOR A DISC BRAKE
Filed Sept. 1, 1966  4 Sheets-Sheet 1

INVENTOR.
RICHARD T. BURNETT.
BY
C. Arens
ATTORNEY.

June 18, 1968 R. T. BURNETT 3,388,774
ADJUSTABLE BEARING MEANS FOR A DISC BRAKE
Filed Sept. 1, 1966 4 Sheets-Sheet 2
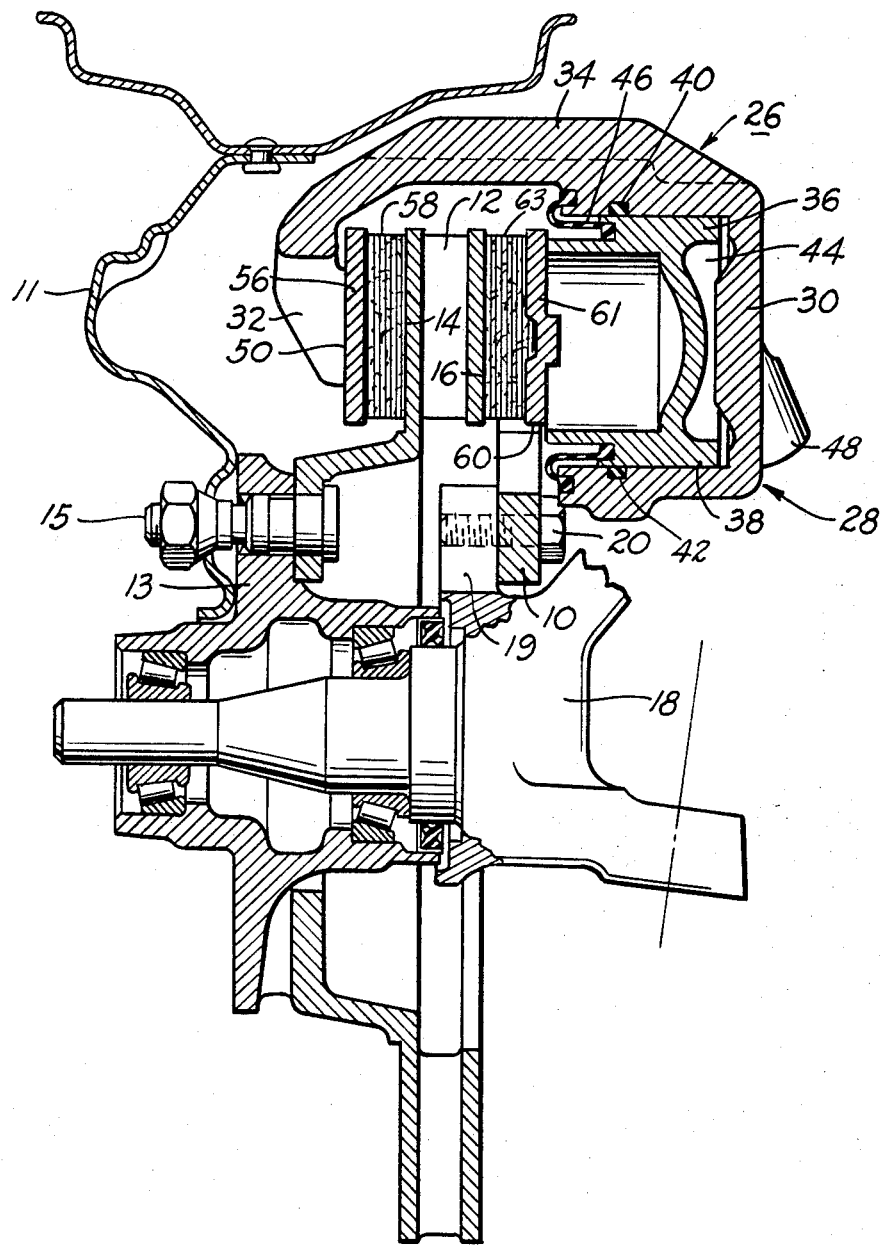
FIG_2
INVENTOR.
RICHARD T. BURNETT.
BY
C. F. Arens
ATTORNEY.

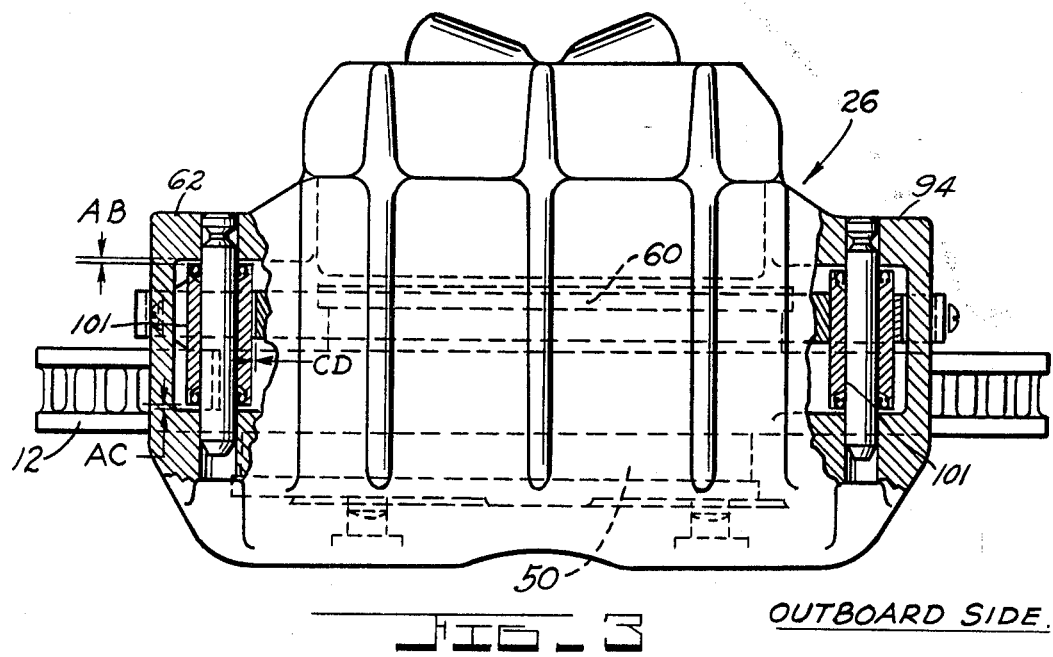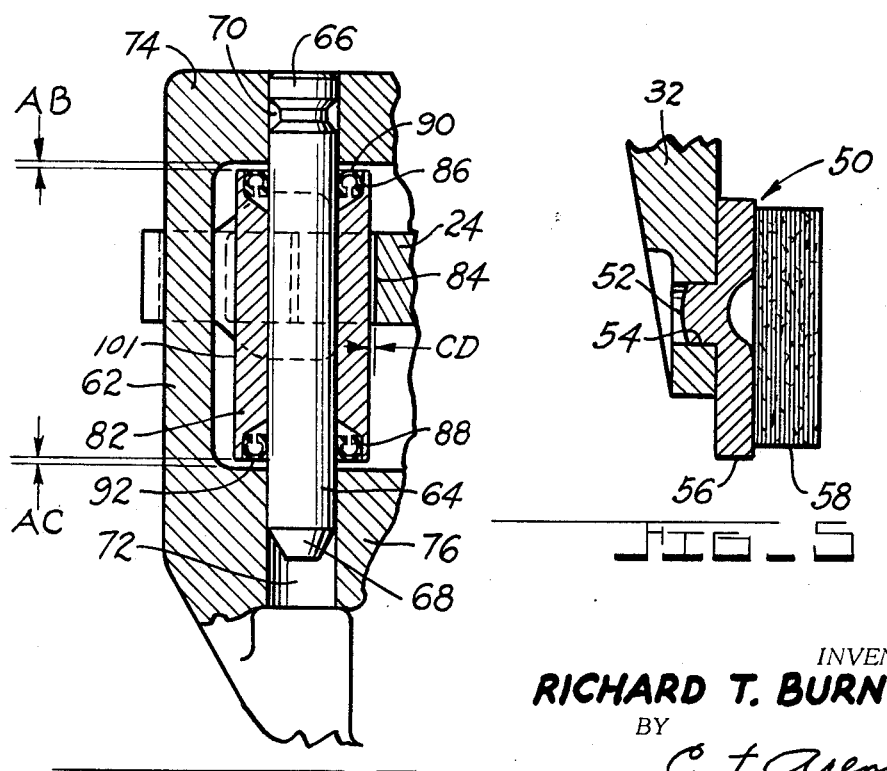

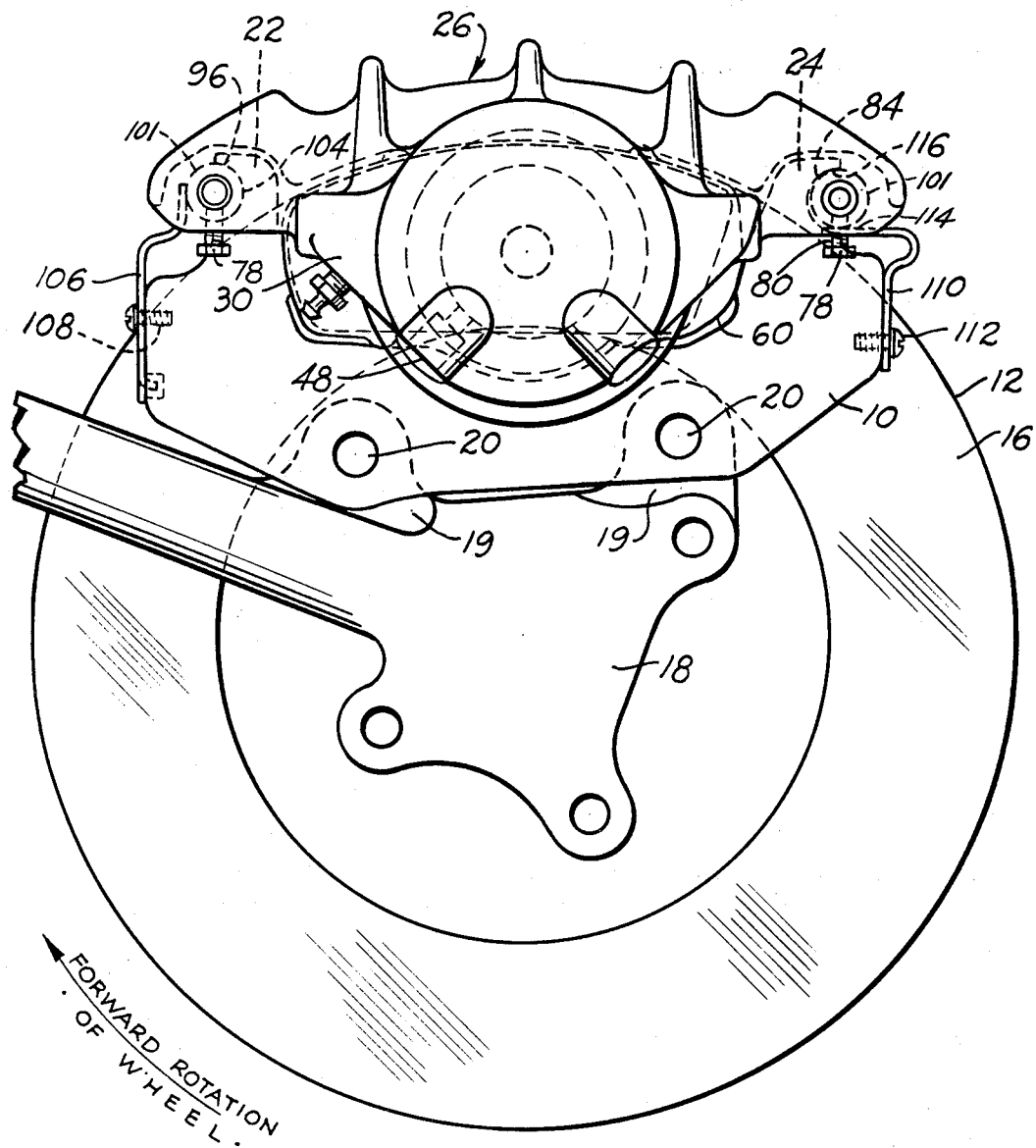

United States Patent Office 3,388,774
Patented June 18, 1968

3,388,774
ADJUSTABLE BEARING MEANS FOR
A DISC BRAKE
Richard T. Burnett, South Bend, Ind., assignor to The
Bendix Corporation, a corporation of Delaware
Filed Sept. 1, 1966, Ser. No. 576,653
5 Claims. (Cl. 188—73)

ABSTRACT OF THE DISCLOSURE

A disc brake wherein a housing which straddles a rotor is slidingly and floatingly carried by a support member with the friction lining members being closely maintained adjacent the rotor surfaces. A bearing assembly operates with the housing and support member to adjust said housing upon friction pad wear or other causes of lateral displacement of the housing. Anti-rattle springs engage the bearing assembly to inhibit free sliding action thereof.

---

One of the main objects of this invention is to provide a floating head type of disc brake which insures minimum pedal travel at all times by maintaining the friction elements adjacent the rotor surfaces.

Another object of the invention is to provide a floating head type disc brake which guarantees parallel friction lining wear.

Still another object of the invention is to provide a floating head type disc brake having a cylinder housing which straddles a rotor member and is floatingly carried on a stationary support for free sliding action up to a given amount toward and away from the rotor surface to compensate for lateral rotor displacement but resisting further movement beyond said given amount by a predetermined resistive force which when overcome repositions said housing with respect to said support.

A further object of the invention is to provide novel connecting means between a stationary support member and a floating head caliper which allows for free sliding action between the housing and stationary support member up to a given amount in order to permit the housing to adjust to accommodate for lateral rotor displacement against the friction elements but resisting said free sliding action of said housing beyond said given amount by a predetermined resistive force which when overcome repositions said housing with respect to said support member.

An important object of this invention is to provide sealed bearing means for connecting a support member to a floating head caliper housing.

A yet further object of the invention is to provide anti-rattle springs for a floating head caliper housing which do not inhibit free sliding action of said caliper housing with respect to its support member.

A more comprehensive object of this invention is to provide a caliper brake, which is simple in construction and economical to manufacture, without sacrificing effectiveness, quietness, fade resistance and resistance to fluid boiling.

A full understanding of the invention may be had from the following detailed description with reference to the accompanying drawings, wherein:

FIGURE 2 is a view in section taken along line 2—2 of FIGURE 1;

FIGURE 3 is a top plan view of the brake of FIGURE 1 with sections cut away, illustrating one of the novel features of the brake;

FIGURE 4 is a side elevational view of the brake of the invention taken from the inboard side;

FIGURE 5 is a fragmentary sectional view taken on the line 5—5 of FIGURE 1, illustrating the connection between the friction element and the caliper housing; and FIGURE 6 is an enlarged fragmentary sectional view of one of the broken away portions of FIGURE 3.

Figure 1:
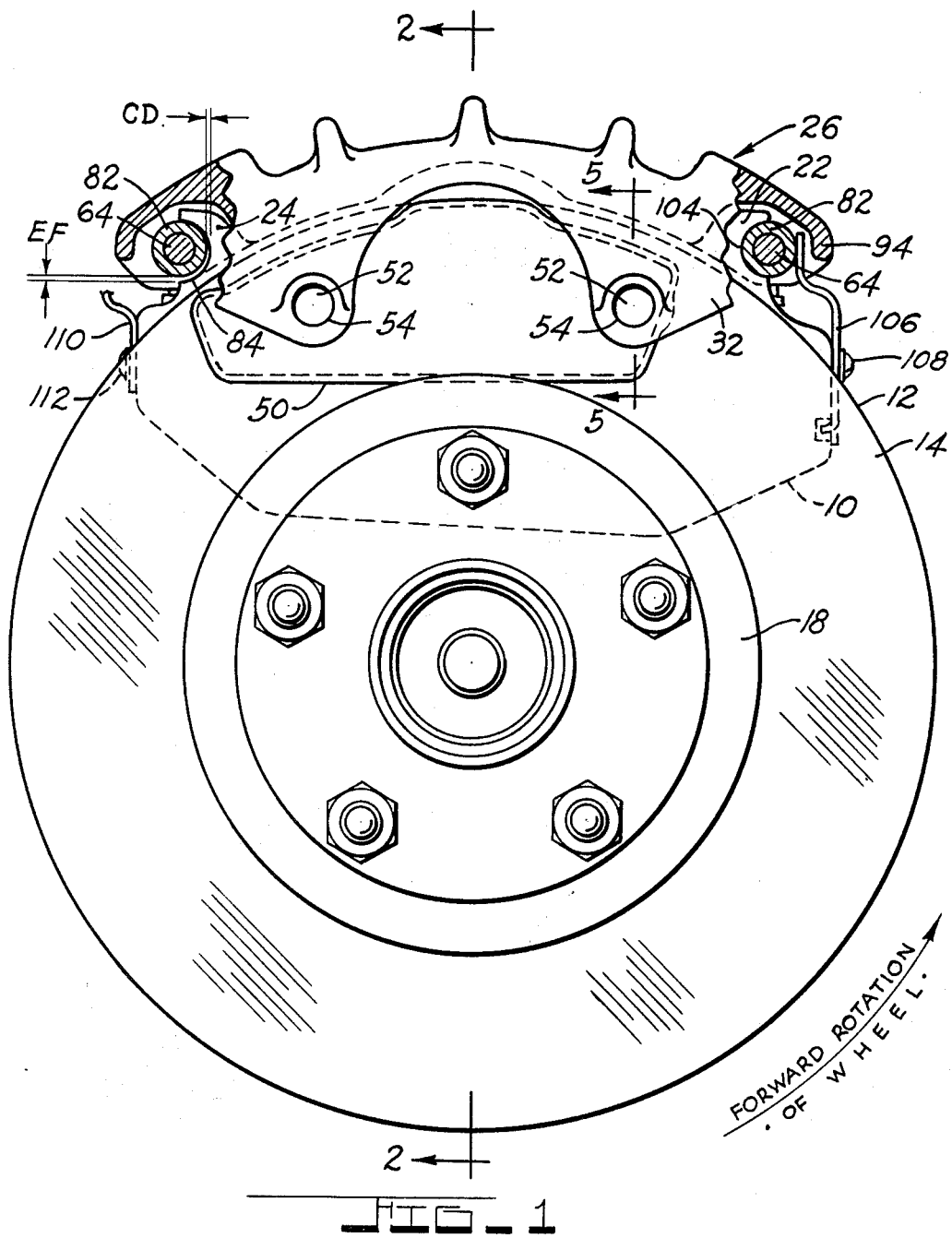
FIGURE 1 is an elevational front view of the disc brake of the invention taken from the out board side as mounted on a vehicle.

Referring now to the drawings, there is illustrated a stationary support member 10 positioned along one side of a rotor 12, which is provided with annular opposed friction faces or surfaces 14 and 16. The rotor is connected to a wheel 11 and hub 13 by bolts 15. The stationary support member is attached to a fixed part of a vehicle, such as a spindle 18, having mounting bosses 19, by bolts 20 extending through the support member and bosses. The support member has a pair of circumferentially spaced arms 22 and 24; see FIGURE 4. The arms are an integral part of the support member 10. A housing 26 straddles the rotor and is slidably mounted on the stationary support member 10 for movement in an axial direction toward and away from said rotor. The housing 26 comprises a portion 30 extending radially inwardly adjacent one side of said rotor and another portion 32 extending radially inwardly along the side of and adjacent to the other side of said rotor. The radial portions 30 and 32 are connected together by a bridge member 34, thus providing a housing made from a single casting. An actuator 28 is located in the radial extending portion 30 and comprises a piston 36 slidably received in a bore 38. A seal 40 is located in a groove 42 of the bore 38 to prevent the escape of fluid from chamber 44 through the open end of the bore. A rubber boot 46 has one end connected to the housing and its other end connected to the piston 36 to prevent contaminants from entering the bore 38.

The outside diameter of the piston 36, the bore 38, the seal size, and the dimensions of the groove 42 are of such relationship that the magnitude of the frictional contact force between the seal and the piston controls the position of the piston in each new position as it moves toward the rotor due to lining wear.

Hydraulic pressure is communicated to chamber 44 through an inlet port 48. A friction element 50 is carried by the radial portion 32 of the housing 26 and lies adjacent one face of the rotor in contact therewith. The friction element 50 is removably attached to the radial portion 32 by inserting projections 52 integral with the friction element, into openings 54 of said radial portion 32. The friction element 50, is shown herein, comprises a backing plate 56 and friction lining 58.

The stationary support member 10, which takes the braking torque, slidably supports a friction element 60 between the spaced arms 22, 24 for frictional engagement with a side of the rotor surface opposite to the side engaged by the friction element 50. The friction element 60 comprises a backing plate 61 and a friction lining 63. Obviously the friction elements 50 and 60 might be one piece if the friction material were sufficiently strong structurally to take the compressive forces without the aid of the backing plates.

The piston 36 of the actuator is positioned adjacent the friction element 60 for moving the friction element into frictional engagement with the rotor 12 upon energization of the fluid motor or actuator 28. The housing 26 floatingly straddles the rotor 12 in such a manner that piston 36 and friction elements 50 and 60 are in substantial axial alignment. The actuator 28 is operatively connected to the friction element 60 via the piston 36 and to the friction element 50 through the housing 26 so that the application of hydraulic pressure to chamber 44 causes the friction elements 50 and 60 to grip the rotor 12.

The housing 26, which straddles the rotor 12, is floatingly carried on the stationary support member 10 by means 62 which allows for a given amount of free movement of said housing with respect to said support member in order to compensate for lateral displacement of said rotor against said friction elements but offering a predetermined resistive force to further movement of said housing with respect to said support member when movement of said housing is in excess of said given amount of movement which when overcome repositions said housing with respect to said support member. Referring specifically to the cut-away sectional views of FIGURE 3, the means 62 which connects the housing 26 to the support member 10 comprises a pin or rod member 64 provided with ends 66 and 68 which slide into openings 70 and 72 of rib members 74 and 76 respectively of said housing. The rib members 74, 76 are formed on the under side of the housing in spaced axial relationship to provide a space between the ribs to receive the spaced arm 24 which acts as a support for the pin or rod member 64. A set screw 78 (FIGURE 4) passes through an opening 80 in the housing for engagement with the pin member 64 to prevent the member from sliding within the openings 70, 72 of the rib members 74, 76 respectively. A sleeve 82 is fitted onto the pin member 64 for sliding movement thereon. The sleeve 82 is received in an opening or slot 84 of the circumferentially spaced arm 24. The sleeve 82 is counterbored at its ends 86 and 88 to receive seals 90 and 92 respectively which not only retain lubricant between the sleeve and pin, if lubrication is desired, but prevent direct and other contaminants from entering between these two parts to thereby insure perfect sliding action at all times.

At the time of assembly of sleeve 82 and pin member 64 to the housing and stationary support member, the sleeve is positioned centrally between the inner portions of rib members 74 and 76 so that the ends of the sleeve are spaced substantially equal distances A-B from the respective ribs 74, 76.

Circumferentially spaced at the other end of the housing, in a clockwise direction as viewed in FIGURE 1, is a second connecting means 94, identical to connecting means 62, for slidably securing the housing to the circumferentially spaced arm 22 of the support member 10. It will be noted that the pin member 64 of the second means 94 is carried in openings 96 and 98 of rib members 100 and 102 respectively. The construction of the rib members 96 and 98 and the relationship of the pin 64 and sleeve 82 to the circumferentially spaced arm 22 is identical to that described in connection with means 62 associated with circumferentially spaced arm 24. The spaced arm 22 is provided with an opening or slot 104 to receive the sleeve 82. It will be observed that the pin 64 and the sleeve 82 in combination provide a bearing member 101 for each of said circumferentially spaced arms 22 and 24 which floatably carry said housing for movement in a direction transverse to the rotor faces.

The spacing between the centers of the sleeves 82 is such that when assembled in their respective slots 84 and 104 there is a space C-D between the exterior wall of the sleeve 82 and the inner wall of slot 84. This space C-D is due to a stack-up of tolerances in manufacturing the parts. This stack-up of tolerances is made to appear at C-D by a leaf spring 106, which has one end securely fixed to the support member 10 by a screw 108 and the other end, which is the free end of the spring, in engagement with the sleeve 82 to thereby urge the sleeve against the inner edge of the slot 104. With the sleeve 82 against the inner edge of the slot 104, the clearance C-D will exist between sleeve 82 and the inner edge of slot 84. The force exerted by the spring 106 in urging sleeve 82 against the inner edge of slot 104 is of a predetermined amount and holds the parts in close fitting relationship to prevent rattling.

A leaf spring 110 has one end detachably secured to the housing adjacent spaced arm 24 by a screw 112. The leaf spring 110 is formed with a free end 114 bent at a right angle to the fixed end of the spring for engagement with the underside of the sleeve 82 to thereby urge said sleeve in a generally radial direction into engagement with an overlying section 116 of the spaced arm 24 which forms the opening or slot 84. The free end 114 is bifurcated so as to straddle the arm 24. The leaf spring 110 is also an anti-rattle spring intended to compensate for a stack-up of tolerances existing between the sleeve diameter and the diametrical opening of the slot 84.

It will be noted that the free end of leaf spring 106 engages the sleeve 82 of the bearing member 101 located in arm 22 to thereby apply a force to the housing and bearing member in a direction along an imaginary line which passes through the centers of the bearing members 101 located respectively in the spaced arms 22 and 24. This action of spring 106 loads the bearing member 101 against the inner edge of the slot 104 of the spaced arm 22 so that the tolerance stack-up of parts appears as a space C-D between inner edge of arm 24 and sleeve 82.

Also the leaf spring 110 has its free end in engagement with the sleeve 82 of the other bearing member 101 located in arm 24 to thereby apply a force thereto which acts in a direction substantially at right angles to said resultant force established by the spring 106 so that the tolerance stack-up of parts appears as a space E-F.

The arrangement of the springs 106 and 110 in this manner simplifies the problem of handling piece part tolerances and provides an extremely effective anti-rattle structure.

*Operation*

Assuming the direction of rotation of the rotor 12 to be clockwise as shown by the arrow in FIGURE 4, upon a brake application fluid pressure will build up in chamber 44 behind the piston 36 (see FIGURE 2) urging the friction element 60 against its adjacent rotor surface 16 and simultaneously with the movement of friction element 60, friction element 50 is caused to engage surface 14 of the rotor as a result of the hydraulic reaction build up in the chamber which is transmitted back through the housing 26 causing it to move axially in the bearing members 101 located in their respective circumferentially spaced arms 22, 24 of the torque taking member 10 to thereby establish a clamping action between the friction elements and the rotor 12.

Initially, that is at the time of assembling the brakes on a vehicle, piston 36, as viewed in FIGURE 2, has a given position in the bore 38 depending upon the thickness of the friction element 60, which is interposed between the piston end and the surface 16 of the rotor. The friction element 50 also has a fixed definite relationship at that time to the rotor surface 14. Actually the linings 58 of the friction elements 50 and 60 are in contact relationship with their respective adjacent rotor faces. The sleeves 82 carried in the slots 84 and 104 also have a given position intermediate the rib members; this relationship does not always exist from a practical standpoint. Under normal operating conditions with the friction elements located so that the friction surfaces of the lining materials 58 and 63 are in slight contact relationship with respect to the respective surfaces 14 and 16, lateral displacement of the rotor 12 will slide or shift the housing 26 on the pin members 64 in the sleeves 82 mounted in the circumferentially spaced arms 22, 24. In other words, lateral rotor deflections of a small magnitude will allow the housing to freely shift or slide in the sleeves 82 due to the fact that the gaps AB and AC are not closed. That is, there is no actual engagement between the ends of the sleeves and their respective associated rib members. However, lateral rotor deflections of such a magnitude as would shift the housing axially an amount in excess of AC so as to engage the ends of the sleeves 82, would shift the sleeves in their respective arms. The sleeves 82 are likewise shifted in their respective arms as the friction elements wear, except that under such circumstances the sleeves are repositioned in their respective arms in one direction only. For example, referring now to FIGURE 3, if we assume that there were no change in the position of the sleeves due to rotor deflections, when the lining wear of friction element 50 exceeds the gap AC the housing will engage the ends of the sleeves which are located in their respective spaced arms to move the sleeves to the inboard side to thereby reposition the sleeves. Also small movements of the sleeves 82 with respect to their associated spaced arms will occasionally occur upon displacement inboard of the rotor caused by spindle deflection, resulting from lateral forces of a vehicle wheel developed in cornering maneuvers of a vehicle, when sufficient lining wear has occurred to require repositioning of the sleeve. If the brakes are applied during cornering of the vehicle, large forces are present which cause the friction elements and housing to move with the rotor as it is displaced laterally. This displacement of the rotor bumps the sleeves in an inboard direction to thereby reposition the sleeves with respect to their associated spaced arms. This repositioning movement of the sleeves is resisted by friction forces due to spring loading.

When the wheel and rotor resume their normal position in straight ahead movement of the vehicle, the housing will move outboard re-establishing the gap AC between the sleeves and housing. This movement is taken on the bearings by sliding action between the sleeves 82 and the pins 64.

If springs are used in the manner shown to inhibit rattling of the brake structure, they will not introduce any loads between the pins 64 and the sleeves 82 so that movement between these members when the brake is released has very little frictional resistance.

Although this invention has been illustrated and described in connection with a specific embodiment, numerous other adaptations of the invention will become apparent to those skilled in the art. It is my intention to include in the scope of the following claims all equivalent structures of the invention whereby the same or substantially the same results will be obtained.

I claim:

1. In a disc brake: a rotor having two friction faces one on each side of said rotor, a torque taking member secured at one side of said rotor and having two circumferentially spaced arms, a caliper housing straddling said rotor, a pair of friction elements one located adjacent each of said friction faces and operatively connected to said housing for frictional engagement with said rotor faces, and means slidably connecting said housing and said torque taking member for movement of said housing with respect to said torque taking member in a direction transverse to said rotor faces, said means including two circumferentially spaced bearing members each mounted on a respective one of said two spaced arms, each of said bearing members comprising a pin element and a sleeve element combination, said combination constructed and arranged so that said pin element and sleeve element have relative axial movement therebetween, said pin element being secured to said housing and said sleeve element being adjustably carried on said torque-taking member for engagement with said housing as it moves transversely.

2. The structure as recited in claim 1 wherein said sleeve element is provided with a seal at each of its ends, each seal being secured to said sleeve element and engaging said pin element operatively and rollingly so as to follow the sliding action of the said pin and sleeve elements to thereby exclude contaminants from between said sleeve and pin elements thus preserving the integrity of the sliding action between said sleeve and pin elements.

3. The structure as recited in claim 1 further including spring means connected between said torque-taking member and said spaced bearing members, said spring means comprising a spring for each bearing member, one of said springs connecting said torque taking member and one of said bearing members so as to apply a resultant force thereto in a direction along an imaginary line which passes through the centers of said bearing members, the other of said springs connecting said torque taking member and the other of said bearing members so as to apply a force thereto in a direction substantially at right angles to said resultant force said spring means thereby providing an anti-rattle function and also offering a predetermined resistance against repositioning of the sleeve elements relative to the housing.

4. The structure as recited in claim 1 wherein said pin element is fixed to said housing and said sleeve element is adjustably secured to said torque taking member and to said pin element, said sleeve element being operatively connected to said housing.

5. In a brake: a rotor having a pair of friction surfaces, a stationary support member, a housing straddling said rotor and floatingly carried by said support member for movement perpendicularly to said friction surfaces, a pair of friction elements one located adjacent each of said rotor surfaces, said housing operatively connected to said friction elements for moving said elements into contact with said rotor surfaces, an actuator mounted on said housing on one side of said rotor for imparting movement to said housing as aforesaid, and means interconnecting said support member and said housing comprising bearing members, each of said bearings members comprising two elements, one of said elements is a pin which slidably supports the housing and the other of said elements is carried by said pin for engagement with said housing to reposition the latter transversely of said rotor, spring means interconnected between said torque-taking member and said bearing members to establish a predetermined load on said bearing members so that the engaging force between said housing and said other of said elements must be in excess of said predetermined load to thereby reposition said housing as aforesaid, said bearing members being further constructed and arranged to allow for a given amount of reasonably free substantially perpendicular movement of said housing with respect to said support member in order to compensate for lateral displacement of said rotor against said friction elements but offering a predetermined resistive force to movement of said housing with respect to said support member when movement of said housing is in excess of said given amount of movement which when overcome repositions said housing with respect to said support member.

References Cited

UNITED STATES PATENTS

| | | |
|---|---|---|
| 2,531,341 | 11/1950 | Meador. |
| 2,784,811 | 3/1957 | Butler _____ 188—73 |
| 2,966,964 | 1/1961 | Brueder _____ 188—73 |
| 3,081,843 | 3/1963 | Dotto et al. _____ 188—73 |
| 3,199,635 | 8/1965 | Bessler et al. _____ 188—73 |

FOREIGN PATENTS

| | | |
|---|---|---|
| 1,008,826 | 11/1965 | Great Britain. |

FERGUS S. MIDDLETON, *Primary Examiner.*

MILTON BUCHLER, *Examiner.*

G. E. HALVOSA, *Assistant Examiner.*